United States Patent [19]

Laumain

[11] Patent Number: 4,600,730

[45] Date of Patent: Jul. 15, 1986

[54] STABLE PREPOLYMERS OF POLYISOCYANATE WITH HYDROXYL FUNCTIONS, A PROCESS FOR THEIR MANUFACTURE AND THEIR APPLICATION TO THE MANUFACTURE OF POLYURETHANES

[75] Inventor: Francois-Bernard Laumain, Levallois-Perret, France

[73] Assignee: Societe Chimique des Charbonnages S.A., France

[21] Appl. No.: 683,630

[22] Filed: Dec. 19, 1984

[51] Int. Cl.[4] .................... C08G 18/14; C08G 18/50
[52] U.S. Cl. ................................ 521/167; 252/182; 521/914
[58] Field of Search ................ 521/167, 914; 252/182

[56] References Cited

U.S. PATENT DOCUMENTS

| | | | |
|---|---|---|---|
| 3,336,242 | 8/1967 | Hampson et al. | 260/2.5 |
| 3,468,819 | 9/1969 | Szabat | 528/48 |
| 3,887,505 | 6/1975 | Demon et al. | 260/2.5 |
| 4,388,420 | 6/1983 | McBrayer | 521/167 |
| 4,451,662 | 5/1984 | DiDomenico | 525/456 |
| 4,469,822 | 9/1984 | Stolz et al. | 521/167 |

*Primary Examiner*—Herbert S. Cockeram
*Attorney, Agent, or Firm*—Finnegan, Henderson, Farabow, Garrett & Dunner

[57] ABSTRACT

Stable polyisocyanate prepolymers containing hydroxy functions, consisting of products of polyaddition of at least one organic polyisocyanate to at least one product of condensation (A) of an alkylene oxide with an amine, in the presence of at least one polyol (B) containing free hydroxy functions, in which the said polyol (B) contains primary hydroxy functions and has a molecular weight greater than or equal to 3,000.

The process for their manufacture consists in reacting, at a temperature between 10° and 150° C., and more usually between 20° and 80° C., the mixture of at least one organic polyisocyanate, at least one condensation product (A) and at least one polyol (B).

12 Claims, No Drawings

STABLE PREPOLYMERS OF POLYISOCYANATE WITH HYDROXYL FUNCTIONS, A PROCESS FOR THEIR MANUFACTURE AND THEIR APPLICATION TO THE MANUFACTURE OF POLYURETHANES

The present invention relates to stable polyisocyanate prepolymers containing hydroxy functions, a process for their manufacture and their application to the manufacture of polyurethanes, in particular foams of high resilience and high hardness.

The reaction of an organic polyisocyanate with a mixture of polyols comprising a polyol free from tertiary nitrogen and 5 to 40% by weight of a polyol containing a tertiary nitrogen, having from 2 to 8 hydroxy groups and having a molecular weight of 175 to 1,000, is already known from U.S. Pat. No. 3,468,819. The person skilled in the art, however, has found that the products thus defined have, on the one hand, very inadequate stability and, on the other hand, viscosities which complicate their use in the manufacture of polyurethanes.

This is why a subject of the present invention lies in the development of polyisocyanate prepolymers containing hydroxy groups, which are obtained according to a simple method, which do not separate, which are stable in the presence of water and have acceptable viscosities which can be lowered further, owing to the stability of the product, by dilution in a third polyol.

Prepolymers according to the invention consist of products of polyaddition of at least one organic polyisocyanate to at least one product of condensation (A) of an alkylene oxide with an amine, in the presence of at least one polyol (B) containing free hydroxy functions, in which the said polyol (B) contains primary hydroxy functions and has a molecular weight greater than or equal to 3,000. In addition, the objective of the present invention will be attained the more successfully, inasmuch as these prepolymers will possess at least one of the following features:

(1) the polyol (B) containing primary hydroxy functions is a polyether or polythioether having a molecular weight of between 3,000 and 10,000, obtained by reaction of an alkylene oxide with a polyfunctional alcohol or a thiodiglycol. Such a polyether or polythioether contains primary hydroxy functions in a proportion ranging from 40 to 90% relative to the total of the primary and secondary hydroxy functions. They preferably have a viscosity which is smaller than or equal to 50 poises and preferably contain from 2 to 6 hydroxy functions per molecule.

(2) The polyol (B) containing primary hydroxy functions is a polyester of high molecular weight, obtained by reaction of a polycarboxylic acid with a polyfunctional alcohol.

(3) The prepolymer is defined by the following four relationships:

(a) $nN/a\alpha + b\beta$ of between 0.05 and 0.95

(b) $n/n+a+b$ of between 0.1 and 0.6, and preferably between 0.20 and 0.50

(c) $b/n+a+b$ of between 0.02 and 0.85, and preferably between 0.10 and 0.80

(d) $a/n+a+b$ of between 0.05 and 0.88, and preferably between 0.20 and 0.60 given that:

"n" is the number of polyisocyanate molecules
N is the number of the NCO functions per molecule
"a" the number of molecules of the condensation products (A)
"b" the number of polyol (B) molecules
$\alpha$ the number of mobile hydrogen functions per molecule of condensation product (A)
$\beta$ the number of mobile hydrogen functions per molecule of polyol (B).

In the whole description of the present invention, there should be understood:

by alkyene oxide, a product such as, for example, ethylene oxide, 1,2-propylene oxide, 1,2-butylene oxide, 2,3-butylene oxide, epichlorohydrin, styrene oxide, tetrahydrofuran, and their derivatives.

by polyfunctional alcohol, a product such as, for example, ethylene glycol, 1,2-propylene glycol, 1,3-butylene glycol, 1,4-butylene glycol, 1,5-pentanediol, 1,4-pentanediol, 1,3-pentanediol, 1,6-hexanediol, 1,7-heptanediol, glycerine, trimethylolpropane, 1,3,6-hexanetriol, pentaerythritol, sorbitol, $\alpha$-methyl-d-glucose, and their derivatives.

by polycarboxylic acid, a product such as, for example, oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, $\alpha$-hydromuconic acid, $\beta$-hydromuconic acid, $\alpha$-butyl-$\alpha$-ethylglutaric acid, $\alpha$, $\beta$-diethylsuccinic acid, isophthalic acid, terephthalic acid, hemimellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid, or also anhydrides or lower alcohol esters of such acids.

by amine, a product chosen particularly from methylamine, ethylamine, propylamine, methylethanolamine, methyldiethanolamine, methylpropanolamine, methyldipropanolamine, ethylethanolamine, ethylpropanolamine, diethanolamine, triethanolamine, methylisopropanolamine, triisopropanclamine, diisopropanolamine, dimethylaminopropylamine, ethylenediamine, hydrazine, toluenediamine, tetramethylenediamine, hexamethylenediamine, N,N'-dimethylhydrazine, 1,3-propylenediamine, 4,4-diaminodiphenylmethanediamine, p-phenylenediamine, 1,4-butanediamine, diethylenetriamine and triethylenetetramine.

by organic polyisocyanate, any polyisocyanate whose organic radical may be aliphatic, aromatic, acyclic, alicyclic or heterocyclic such as, for example, ethylene diisocyanate, ethylidene diisocyanate, 1,2-propylene diisocyanate, 1,2-cyclohexylene diisocyanate, 2,6-tolylene diisocyanate, 4,4'-diphenylmethane diisocyanate, 3,3'-dimethoxy-4,4'-diphenylene diisocyanate, p,p',p"-triphenylmethane diisocyanate, 1,5-naphthalene diisocyanate, furfurylidene diisocyanate, polyphenylpolymethylene polyisocyanates and the polyisocyanates containing carbodiimide, urethane, allophanate, isocyanate or ureido groups.

A process for manufacturing the prepolymers according to the invention consists in reacting, at a temperature of between 10° and 150° C., and more usually between 20° and 80° C., the mixture of at least one organic polyisocyanate, at least one condensation product (A) and at least one polyol (B). Where appropriate, the reaction may be carried out in the presence of a catalyst such as triethylenediamine or stannous octoate.

With the prepolymers of the invention it is possible to prepare polyurethane foams or elastomers by employing the formulae and the operating procedures which are well known to the person skilled in the art and similar to those which are described, for example, in the following works:

Flexible Polyurethane Foams by G. Woods—1982—Appl. Sciences Publishers.

Kunstoff Handbuch by VIEWEG-HÖCHTLEN—vol. 7

Advances in Urethane Science and Technology by FRISCH and REEGEN—vol. 1 to 8.

These prepolymers have the advantage of producing a cell-opening effect, that is to say that in the case where foam is manufactured, the latter does not retract.

The following, non-restrictive examples illustrate the invention. The definition of compounds A and B in the examples is given in the attached Table. The polyisocyanate employed is a mixture of the 2,4- and 2,6-isomers of toluene diisocyanate in the ratio 80:20 (TDI) or of the practically pure 4,4'-diphenylmethane diisocyanate (MDI).

Mixing of the compounds is carried out by means of a turbine-type stirrer at a speed of $1 \times 10^3$ revolutions/minute in cans of 2 to 5 liter capacity. The viscosity of the product obtained is measured with a Brookfield viscometer. The number of the spindle employed is shown in each example.

EXAMPLE 1

650 g of compound 1 B followed by 116 g of compound 1 A are introduced at room temperature into a 3-liter metal receptacle. The mixture is stirred for 3 minutes and then 87 g of TDI are poured in over 2 minutes. The mixture is stirred for 10 minutes. A temperature of 35° C. is observed. The product obtained is white and its viscosity at 25° C. is 43,750 centipoises (LV 4 spindle).

To demonstrate the stability of the product obtained, 30 g of the product obtained above are added to 70 g of compound 1 B, followed by 3 g of water, 0.2 g of triethylenediamine diluted to 33% strength in dipropylene glycol (Dabco 33), 0.4 g of silicone oil (Tegostab BF 4380). 2 g of triethanolamine, 1 g of glycerine and 1.2 g of dimethylaminopropylamine. The mixture has a viscosity of 3,750 centipoises (LV 2 spindle). After 24 hours the mixture shows neither deposit nor separation. After centrifuging for 30 minutes at 5,200 revolutions/minute, the mixture shows no deposit.

EXAMPLE 2 (comparative)

Under the conditions of Example 1, 900 g of compound 1 B, 48.7 g of triethanolamine and 51.2 g of TDI are mixed. To 100 g of the product obtained, and cooled, are added 3 g of water, 0.2 g of Dabco 33, 1.2 g of dimethylaminopropylamine, 0.4 g of silicone oil (BF 4380), 2 g of triethanolamine and 1 g of glycerine. The viscosity of the mixture increases slowly, changing from 2,700 to 5,800 centipoises in 1 hour (LV 3 spindle) and after 24 hours two separate phases are seen.

EXAMPLE 3

Under the conditions of Example 1, 116 g of compound 1 A, followed by 34.8 g of TDI, are added to 2,600 g of compound 1 B. A temperature of 36° C. is noted after 12 minutes and the viscosity of this white product is 1,725 centipoises at 25° C. (LV 2 spindle).

EXAMPLE 4

Under the conditions of Example 1, 58 g of compound 1 A, followed by 69.6 g of TDI, are added to 2,600 g of compound 1 B. A temperature of 33° C. is noted after 12 minutes and the Brookfield viscosity of this transparent product is 5,050 centipoises at 25° C. (LV 3 spindle).

EXAMPLE 5

Under the conditions of Example 1, 29 g of compound 1 A followed by 17.4 g of TDI, are added to 2,400 g of compound 2 B. No appreciable temperature rise is noted. A transparent product is obtained. 2 g of Kosmos 29 (stannous octoate) are then added, and the whole is stirred and heated for 1 hour at 80° C. with stirring.

A slightly opalescent product is obtained, the Brookfield viscosity of which is 650 centipoises at 25° C. (LV 2 spindle).

When mixed with water and with catalysts under the same conditions as in Example 1, this product is stable.

EXAMPLE 6

Under the conditions of Example 1, 116 g of compound IA, followed by 69.6 g of TDI, are added to 600 g of compound 2 B. After 12 minutes, a temperature of 40° C. is noted and the Brookfield viscosity of the white product obtained is 18,500 centipoises at 25° C. (LV 4 spindle).

When mixed with water and with catalysts under the same conditions as in Example 1, this product is stable.

EXAMPLE 7

Under the conditions of Example 1, 105 g of compound 2 A, followed by 52.2 g of TDI, are added to 650 g of compound 1 B. A temperature of 42° C. is noted after 12 minutes and a transparent product is obtained, the Brookfield viscosity of which is 192,000 centipoises at 25° C. (LV 4 spindle).

To determine the presence of free NCO functions, 100 g of compound 1 B are taken and 5 g of water are added. The mixture is stirred gently for 30 seconds. The mixture thickens and becomes slightly white. 1 g of Kosmos 29 (stannous octoate) is added and the mixture is stirred for 30 seconds. 1 g of TDI is then added and the mixture is stirred for 30 seconds. The mixture whitens and bubbles are seen to appear. After 5 minutes, a white foamy paste is obtained. The theoretical ratio number of NCO functions/number of OH functions is equal to 1.6%.

The presence of more than 1.6% of free NCO groups originating from TDI is thus determined.

This test is carried out by taking 100 g of the modified polyol of Example 6. Neither a gaseous reaction nor the formation of a foamy paste are observed.

EXAMPLE 8

Under the conditions of Example 1, 116 g of compound 1 A, followed by 128 g of Isonate 143 L (pure MDI), are added to 650 g of compound 1 B. A temperature of 63° C. is noted after 12 minutes and a white product is obtained the Brookfield viscosity of which is 33,000 centipoises at 25° C. (LV 4 spindle).

When mixed with water and with catalysts as in Example 1, this modified polyol is stable.

EXAMPLE 9

Under the conditions of Example 1, 141 g of compound 3 A, followed by 52.2 g of TDI, are added to 1,400 g of compound 3 B. A temperature of 39° C. is observed after 12 minutes and a white product is obtained.

When placed in the presence of water and Kosmos 29, as in Example 7, this product shows no gas release and does not set.

This product is thixotropic; in fact, the following values are found in the Brookfield viscometer:

| Spindle No. | Speed of rotation (revolutions/minute) | Viscosity in centipoises |
|---|---|---|
| LV 3 | 6 | 2,600 |
| LV 3 | 12 | 2,420 |
| LV 3 | 30 | 2,260 |
| LV 2 | 12 | 1,850 |

EXAMPLE 10

Under the conditions of Example 1, 616.5 g of compound 4 A are added to 1,083 g of compound 1 B after 2 g of triethylenediamine have been dissolved. 29 g of TDI are then added. A temperature of 39° C. is noted after 12 minutes and an opalescent product is obtained, the Brookfield viscosity of which is 10,600 centipoises at 25° C. (LV 3 spindle).

When placed in the presence of water, under the same conditions as in Example 7, this product does not change in appearance, does not set and shows no gas evolution.

EXAMPLE 11

Under the conditions of Example 1, 116 g of compound 1 A and 69.6 g of TDI are added to 1,300 g of compound 4 B. A temperature of 35° C. is noted after 12 minutes and a white product is obtained, the Brookfield viscosity of which is 10,400 centipoises at 25° C. (LV 3 spindle).

When placed in the presence of water and catalysts as in Example 1, this product does not separate.

EXAMPLE 12

Under the conditions of Example 1, 146 g of compound 1 A and 52.2 g of TDI are added to 1,300 g of compound 1 B. A temperature of 36° C. is noted after 12 minutes and a white product is obtained, the Brookfield viscosity of which is 5,000 centipoises at 25° C. (LV 3 spindle).

EXAMPLE 13

Under the conditions of Example 1, 96 g of compound 1 A and 57.4 g of TDI are added to 1,650 g of compound 5 B. A temperature of 33° C. is noted after 12 minutes and a white thixotropic product is obtained.

| Spindle No. | Speed of rotation (revolutions/minute) | Viscosity in centipoises |
|---|---|---|
| LV 4 | 3 | 32,400 |
| LV 4 | 6 | 26,500 |
| LV 4 | 12 | 19,750 |
| LV 4 | 30 | 13,400 |

EXAMPLE 14

A mixture of 1,280 g of compound 6 B, 1 g of triethylenediamine and 116 g of compound 1 A is heated to 80° C. 69.6 g of TDI are then added to the hot product. The product is stirred and allowed to cool while being stirred. A white product is obtained, the Brookfield viscosity of which is 20,000 centipoises at 25° C. (LV 4 spindle).

When it is mixed with water and Kosmos 29, as in Example 7, no gas evolution nor setting is observed.

EXAMPLE 15

The procedure is as in Example 1. 48.3 g of compound 1 A (0.167 mole), followed by 29 g of TDI, are added to 1,082 g of compound 1 B. A temperature of 36° C. is noted after 12 minutes and the Brookfield viscosity of the white product obtained is 2,550 centipoises at 25° C. (LV 2 spindle).

EXAMPLE 16 (comparative example)

Under the conditions of Example 14, 10 g of ethylenediamine (0.167 mole), followed by 290 g of TDI, are added to 1,082 g of compound 1 B. A temperature of 42° C. is noted after 10 minutes and a very viscous white paste is obtained. After 24 hours, the product has set.

EXAMPLE 17

Under the conditions of Example 1, 116 g of compound 1 A, followed by 69.6 g of TDI are added to 1,300 g of compound 7 B. A temperature of 35° C. is noted after 12 minutes and a white product is obtained, the Brookfield viscosity of which is 5,250 centipoises at 25° C. (LV 3 spindle).

EXAMPLE 18

Under the conditions of Example 1, 14.8 g of TDI, followed by 2 g of Kosmos 29, are added to 647.5 g of compound 8 B (which acts as both compound A and compound B). After stirring, the whole is heated for 1 hour at 80° C.

A transparent product is obtained, the Brookfield viscosity of which is 610 centipoises at 27° C. (LV 2 spindle).

When mixed with water and with Kosmos 29 under the same conditions as in Example 7, the mixture whitens slightly but neither gas evolution nor setting is observed.

EXAMPLE 19

Under the conditions of Example 1, 1,470 g of compound 7 B are mixed with 2 g of Kosmos 29 and 225 g of compound 5 A. 52.2 g of TDI are then added and the mixture is stirred. A temperature of 31° C. is noted after 12 minutes. A transparent yellow compound is obtained (compound 7 B is yellow) the viscosity of which is 2,700 centipoises at 25° C. (LV 2 spindle).

On mixing with water and with Kosmos 29 as in Example 7, no setting is observed.

EXAMPLE 20

210 g of compound 1 B, 90 g of the product of Example 1, 9 g of water, 3 g of diethanolamine, 1.2 g of Dabco 33, 1.2 g of silicone oil BF 4380, and 1.8 g of silicone oil 4113 are introduced into a beaker and stirred, the temperature being controlled at 22° C. 0.75 g of Kosmos 29 is then added, the mixture is stirred for 10 seconds, after which 107 g of TDI are added. The whole is stirred for 5 seconds and the mixture is poured into a paper cube. The expansion begins and finishes 150 seconds after the start of the addition of the isocyanate. At the end of the expansion, gas evolution is observed.

A foam which does not retract is obtained, with a density of 30 kg/m$^3$, and a residual deformation of 10%

(French Standard NF 56 112) (Conditions: 70° C. and 90% indentation for 22 hours).

EXAMPLE 21 (comparative example)

The procedure is as in Example 20. 9 g of water, 3 g of diethanolamine, 1.2 g of Dabco 33, 1.2 g of silicone oil BF 4380, and 1.8 g of silicone oil 4113 are added to 300 g of compound 1 B, and the mixture is stirred. 0.75 g of Kosmos 29 are then added, followed by 107 g of TDI. A foam which has a very high retraction is obtained.

EXAMPLE 22

The procedure is as in Example 20. 90 g of the modified polyol of Example 8, followed by 9 g of water, 3 g of diethanolamine, and 1.2 g of Dabco 33, 1.2 g of silicone oil BF 4380, and 1.8 g of silicone oil 4113 are added to 210 g of compound 1 B. The mixture is stirred. 0.45 g of Kosmos 29 is added, followed by 118 g of TDI. The whole is stirred and then poured into a cube. The expansion time begins and ends 80 seconds after the start of the addition of isocyanate. At the end of the expansion no gas evolution is observed.

A non-retracting foam is obtained with a density of 30 kg/m$^3$ and a residual deformation of 9%.

The CLD hardness (Standard 56 110) is:
at 25%: 1.85 kPa
at 50%: 2.72 kPa
at 65%: 4.45 kPa
Its horizontal rebound is 51 cm.

To determine the horizontal rebound, a 28 g steel ball is allowed to fall from a height of 60 cm on a specimen in the form of a right prism, the dimensions of which are 10 cm × 10 cm × 5 cm. The ball rebounds on one of the two larger faces, which is placed inclined at 30° relative to the horizontal. The distance, in cm, which separates the center of the specimen from the point of fall of the ball after its rebound on the specimen is measured.

EXAMPLE 23

The procedure is as in Example 20. 90 g of the modified polyol of Example 17, followed by 9 g of water, 9 g of diethanolamine, 1.2 g of Dabco 33, 1.2 g of Silicone BF 4380, 1.8 g of Silicone 4113 are added to 210 g of compound 1 B. The mixture is stirred and then 0.3 g of Kosmos 29 and 107 g of TDI are added. The whole is poured into a cube. The expansion time is 105 seconds.

A foam is obtained which shows no retraction, of density 29 kg/m$^3$ and the residual deformation of which has a value of 6%.

Its CLD hardness is:
at 25%: 1.39 kPa
at 50%: 2.27 kPa
at 65%: 4.07 kPa
Its horizontal rebound is 50 cm.

EXAMPLE 24

The procedure is as in Example 20, with the following formulation:
Compound 1 B: 210 g
Modified polyol of Example 10: 90 g
Water: 9 g
Diethanolamine: 3 g
Silicone 4113: 2.8 g
Dabco 33: 0.42 g
Niax A1 (amino catalyst): 0.36 g
TDI: 115.8 g
The expansion time is 135 seconds.

A non-retracting foam is obtained, whose properties are as follows:
CLD at 25%: 1.44 kPa
CLD at 50%: 2.29 kPa
CLD at 65%: 3.83 kPa
Density: 32 kg/m$^3$
Residual deformation: 12%
Rebound: 49 cm

EXAMPLE 25

The procedure is as in Example 20, with the following formulation:
Compound 1 B: 210 g
Modified polyol of Example 13: 90 g
Water: 9 g
Diethanolamine: 3 g
Dabco 33: 2.1 g
Silicone 4380: 1.2 g
Silicone 4113: 1.8 g
TDI: 117.8 g
The expansion time is 105 seconds.
A foam is obtained, whose properties are as follows:
Density: 32 kg/m$^3$
CLD at 25%: 1.17 kPa
CLD at 50%: 1.86 kPa
CLD at 65%: 3.33 kPa
Residual deformation: >30%
Rebound: 51 cm

EXAMPLE 26

The procedure is as in Example 20, with the following formulation:
Modified polyol of Example 5: 200 g
Water: 9.6 g
Dimethylethanolamine: 0.6 g
Silicone oil Tegostab 2370: 1.8 g
Kosmos 29: 0.4 g
TDI: 117.8 g
The expansion time is 100 seconds.
A foam is obtained whose properties are as follows:
Density: 22.5 kg/m$^3$
CLD at 25%: 2.75 kPa
CLD at 50%: 3.85 kPa
CLD at 65%: 5.50 kPa
Rebound: 42 cm

EXAMPLE 27 (comparative example)

The procedure is as in Example 20, with the following formulation:
Compound 2 B: 200 g
Water: 9.6 g
Dimethylethanolamine: 0.6 g
Tegostab 2370: 1.8 g
Kosmos 29: 0.4 g
TDI: 116.8 g
The expansion time is 87 seconds.
The properties of the foam obtained are:
Density: 22.5 kg/m$^3$
CLD at 25%: 2.50 kPa
CLD at 50%: 3.55 kPa
CLD at 65%: 5.15 kPa
Rebound: 41 cm

EXAMPLE 28

The procedure is as in Example 20, with the following formulation:
Modified polyol of Example 18: 200 g
Water: 9.6 g Tegostab 2370: 1.2 g
Dimethylethanolamine: 0.3 g
Kosmos 29: 0.4 g
TDI: 113 g A foam is obtained, the expansion time of which is 67 seconds and the density of which is 21.5 kg/m³.

EXAMPLE 29 (example of an elastomer)

An elastomer is prepared in the following manner:
600 g of compound 2 B are weighed and 400 g of the modified polyol manufactured in Example 9 are added. 300 g of Tuboryl N, 300 g of Millicarb, 300 g of Dolomite SRB5, 50 g of 4 Angström molecular sieve, and 8 g of silicone oil Rhodorsil 9203 are then added. The mixture is stirred slowly for 1 hour while inclusion of air in the mixture is avoided, and then the whole is put for 20 minutes in a desiccator, in which a vacuum of 5 mm of mercury is produced by means of a vane pump.

400 g of this mixture are then taken, and then 1 g of Super Adit (mercury salt) is added, followed by 23.7 g of Lilene T838 (modified isocyanate). This is mixed for 30 seconds, bubbles are removed under vacuum (5 mm Hg) for 5 minutes and the whole is poured into an open mold to cast a plaque 4 mm thick. The material is degassed by heating the plaque for 10 minutes with a butane flame.

The drying time is less than 24 hours.

A plaque is obtained, for which the following characteristics are measured:

Shore Hardness A (ASTM standard D 2240): 72
Elongation (French standard NFT 46 002): 76%
Breaking stress (French standard NTF 46 002): 2,430 kPa
Cissoidal tear (French standard NFT 54 107): 10,400 N/m EXAMPLE 30 (comparative example)

The procedure is as in the preceding example, with the modified polyol being replaced by compound 3 B. A mixture containing 600 g of polyol 5, 400 g of compound 3 B, 300 g of Tuboryl N, 300 g of Millicarb, 300 g of Dolomite SRB 5, 50 g of 4 Angstrom molecular sieve and 8 g of Rhodorsil 9203 is prepared. The materials are mixed and then degassed under vacuum.

400 g of this mixture are then taken and 1.6 g of Super Adit and 20.6 g of Lilene T 838 are then added. The materials are mixed for 30 seconds; bubbles are removed under vacuum (5 mm Hg) and a plaque 4 mm thick is cast. It is degassed with butane.

The drying time is less than 24 hours.

The characteristics of the plaque obtained are as follows:

Shore Hardness A (ASTM standard D 2240): 67
Elongation (French standard NFT 46,002): 106%
Breaking stress (French standard NFT 46,002): 1.886 kPa
Cissoidal tear (French standard NFT 54 107): 10,800 N/m

APPENDIX

| Initiating compound | Compound A | | | | | Compound B | | | | | | | |
|---|---|---|---|---|---|---|---|---|---|---|---|---|---|
| | 1 Ethyl- enedi- amine | 2 Tri- ethanol- amine | 3 Ethyl- enedi- amine | 4 Ethyl- enedi- amine | 5 Ortho- toluene- diamine | 1 Glyc- erine | 2 Glyc- erine | 3 Pro- pylene glycol | 4 Penta- eryth- ritol | 5 Niax 3232 | 6 Tri- methyl- ol- pro- pane | 7 Tri- methyl- ol- pro- pane | 8 Ethyl- enedi- amine |
| % by weight of propylene oxide | 100 | 100 | 100 | 85 | 55 | 86 | 90 | 85 | 84 | manufac- tured by SHELL | 95 | 84 | 85 |
| % by weight of ethylene oxide | 0 | 0 | 0 | 15 | 45 | 14 | 10 | 15 | 16 | Grafted polyol contain- ing pri- mary OHs | | | |
| Molecular weight | 290 | 350 | 470 | 3700 | 750 | 6500 | 3000 | 3500 | 6500 | | 6400 | 4900 | 3700 |
| Percentage number of primary hydroxy groups | 0 | 0 | 0 | >10 | 0 | 80 | 35 | 90 | 72 | | 40 | 75 | >10 |

I claim:

1. Stable polyisocyanate prepolymers containing hydroxy groups, consisting of products of polyaddition of at least one organic polyisocyanate to at least one product of condensation (A) of an alkylene oxide with an amine, in the presence of at least one polyol (B) containing free hydroxy functions, in which the said polyol (B) contains primary hydroxy functions and has a molecular weight greater than or equal to 3,000.

2. Prepolymers as claimed in claim 1, in which the prepolymers are defined by the following four relationships:

(a) $nN/a\alpha + b\beta$ of between 0.05 and 0.95;
   (b) $n/n+a+b$ of between 0.1 and 0.6;
   (c) $b/n+a+b$ of between 0.02 and 0.85; and
   (d) $a/n+a+b$ of between 0.05 and 0.88, wherein $n$ is the number of polyisocyanate molecules,
   $N$ is the number of NCO functions per molecule,
   $a$ is the number of condensation product (A) molecules,
   $b$ is the number of polyol (B) molecules,
   $\alpha$ is the number of mobile hydrogen functions per molecule of condensation product (A), and
   $\beta$ is the number of mobile hydrogen functions per molecule of polyol (B).

3. Prepolymers as claimed in claim 1 or 2, in which the polyol (B) containing primary hydroxy functions is a polyether or polythioether having a molecular weight of between 3,000 and 10,000, obtained by reaction of an alkylene oxide with a polyfunctional alcohol or a thiodiglycol.

4. Prepolymers as claimed in claim 3, in which the said polyether or polythioether contains primary hydroxy functions in a proportion varying from 40 to 90% relative to the total of the primary and secondary hydroxy functions.

5. Prepolymers as claimed in claim 4, in which the said polyether or polythioether has a viscosity lower than or equal to 50 poises.

6. Prepolymers as claimed in claim 5, in which the said polythioether or polyether contains from 2 to 6 hydroxy functions per molecule.

7. Prepolymers as claimed in claim 1 or 2, in which the polyol (B) containing primary hydroxy functions is a high molecular weight polyester.

8. Prepolymers as claimed in claim 2, in which relationship (b) is between 0.20 and 0.50, relationship (c) is between 0.10 and 0.80 and relationship (d) is between 0.20 and 0.60.

9. Prepolymers as claimed in claim 3, in which the said polyether or polythioether has a viscosity lower than or equal to 50 poises.

10. Prepolymers as claimed in claim 9, in which the said polythioether or polyether contains from 2 to 6 hydroxy functions per molecule.

11. Prepolymers as claimed in claim 3, in which the said polythioether or polyether contains from 2 to 6 hydroxy functions per molecule.

12. Prepolymers as claimed in claim 1, in which the said polythioether or polyether contains from 2 to 6 hydroxy functions per molecule.

* * * * *